US006223470B1

(12) United States Patent
Millard et al.

(10) Patent No.: US 6,223,470 B1
(45) Date of Patent: May 1, 2001

(54) DROPGLASS WINDOW MODULE

(75) Inventors: Kevin R. Millard, Sterling Heights; William T. DuFour, Shelby Township, both of MI (US); Ricky J. Mason, Lawrenceburg; William D. Ray, II, Kingston, both of TN (US); Travis H. Briggs, Novi; James J. Denison, Westland, both of MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/399,517

(22) Filed: Sep. 20, 1999

(51) Int. Cl.[7] ........................................................ B60J 5/10
(52) U.S. Cl. .............................................. 49/374; 49/352
(58) Field of Search ............................ 49/168, 169, 360, 49/37, 349, 352, 372, 375, 378, 374; 296/146.16

(56) References Cited

U.S. PATENT DOCUMENTS

| | | | |
|---|---|---|---|
| 2,714,035 | * 7/1955 | Limberg et al. | 296/146.16 |
| 2,747,921 | * 5/1956 | Hooverson et al. | 296/146.16 |
| 3,770,312 | * 11/1973 | Shadburn | 296/146.16 |
| 4,119,341 | * 10/1978 | Cook | 296/146.16 |
| 4,170,847 | 10/1979 | Pickles . | |
| 4,502,248 | 3/1985 | Thomas, Jr. et al. . | |
| 4,543,747 | * 10/1985 | Kaltz et al. | 49/249 |
| 4,620,746 | * 11/1986 | Alexander | 296/146.16 |
| 4,671,013 | * 6/1987 | Friese et al. | 49/380 |
| 4,793,099 | 12/1988 | Friese et al. . | |
| 4,874,201 | 10/1989 | Scaglietti . | |
| 5,363,537 | * 11/1994 | Schneider et al. | 24/289 |
| 5,442,880 | * 8/1995 | Gipson | 49/413 |
| 5,473,840 | * 12/1995 | Gillen et al. | 49/380 |
| 5,542,214 | 8/1996 | Buening . | |
| 5,623,785 | 4/1997 | Mariel . | |
| 5,657,580 | 8/1997 | Kobrehel . | |
| 5,724,769 | 3/1998 | Cripe et al. . | |
| 5,775,029 | 7/1998 | Buening . | |
| 5,784,832 | 7/1998 | LeeVan . | |
| 5,799,449 | 9/1998 | Lyons et al. . | |
| 5,822,922 | 10/1998 | Grumm et al. . | |
| 5,832,667 | 11/1998 | Buening et al. . | |
| 5,836,110 | 11/1998 | Buening . | |
| 5,839,231 | 11/1998 | Gebhart et al. . | |
| 5,864,987 | 2/1999 | Mariel et al. . | |
| 5,996,284 | * 12/1999 | Freimark et al. | 49/380 |
| 6,014,840 | * 1/2000 | Ray et al. | 49/413 |

* cited by examiner

*Primary Examiner*—Daniel P. Stodola
*Assistant Examiner*—Curtis A. Cohen
(74) *Attorney, Agent, or Firm*—Peter D. McDermott; Banner & Witcoff, LTD

(57) ABSTRACT

A dropglass window module having a sliding pane between a first fixed pane and a second fixed pane, and a skeletal framework comprising left and right division bars, a header and a beltline support where the header and beltline support are each connected to the division bars. The skeletal framework and the fixed panes are bonded together by a plastic encapsulation frame which is preferably injection molded. The fixed panes are positioned entirely within the circumference of the frame. The division bars cooperate with top and bottom segments of the frame to define a central opening, and the sliding pane is movable by a motor between a full open position and a closed position where the sliding pane closes the central opening. In at least some preferred embodiments the beltline support is entirely encapsulated by the plastic frame. Preferably the dropglass window module has four outside seals which cooperate with the sliding pane to seal the central opening from the outside elements when the sliding pane is in the closed position. One seal is on each division bar, one mounted to the bottom segment of the frame, and one mounted at the header.

17 Claims, 4 Drawing Sheets

DROPGLASS WINDOW MODULE

FIELD OF THE INVENTION

The present invention is directed to a motor operated vehicle window construction and, more particularly, to a dropglass sliding window suitable for use in a motor vehicle.

BACKGROUND OF THE INVENTION

Motor vehicle window assemblies typically have one or more sliding panes, that is, panes which slide from a closed position to a full open position, and which may be either manually operated or operated by an electric motor. Such window assemblies are used, for example, as rear slider windows for pickup truck cabs to increase airflow into the motor vehicle. Typically such rear slider windows have a circumferential (that is, outer peripheral) frame in which the sliding pane is mounted along with one or more fixed panes. The frame may be structural or semi-structural in that it integrates the sliding pane and one or more fixed panes as a self-contained preassembled module suitable for shipping and handling prior to installation into a motor vehicle.

Sliding window assemblies are increasingly popular, particularly when used for backlights in pickup trucks. A power window assembly for a vehicle having a sliding pane is shown in U.S. Pat. No. 5,724,769 to Cripe et al. Cripe et al is a robust design for a pull-pull power sliding window assembly having left and right fixed panes and a horizontally sliding center pane sliding between upper and lower run channels. A drive motor, drive drum and drive cable pull the sliding pane back and forth in a manner similar to conventional cable drum window regulators. Cable directional blocks route drive cable from below the frame to a lower horizontal peripheral edge of the sliding pane. Such a design advantageously routes the cables so as to avoid excessive drag associated with pulling the sliding pane up against the upper run channel or down against the lower run channel.

While such a design is excellent for reducing friction and thereby minimizing wear and tear, it has been found increasingly desirable to maximize a central air opening created when the sliding pane moves to the full open position. The size of the opening created in a horizontally sliding window module such as that disclosed in Cripe et al is necessarily limited by not only the size of the sliding pane but also by the requirement that the sliding pane slide back and forth within the frame of the module. Thus, the length of the run channels, the size of the fixed panes, and the overall size of the modular window assembley all act to limit the maximum available size of the air opening when the sliding pane moves to the full open position. It would be desirable to provide a sliding window assembly where the air opening produced when the sliding pane moves to the full open position is increased beyond that available with conventional horizontally sliding panes positioned in a sliding window module.

In view of the foregoing, it is an object of the present invention to provide a sliding window assembly having a central opening can be closed by a sliding pane where the central opening is significantly larger than central openings in traditional horizontally sliding window assemblies.

It is an additional object of at least certain preferred embodiments of the present invention to provide a sliding window assembly for a motor vehicle having attractive exterior styling while preserving structural integrity of the motor vehicle. It is another related object of the present invention to provide a sliding window assembly that is highly reliable in operation. Additional objects and optional features of the invention will be apparent form the following disclosure and detailed discussion of preferred embodiments.

SUMMARY OF THE INVENTION

In accordance with a first aspect, there is provided a sliding window assembly having a first fixed pane and a second fixed pane, left and right division bars with each division bar having a run channel, and an encapsulation frame bonding together the first fixed pane, the second fixed pane, and the left and right division bars. The encapsulation frame has a circumference which extends around the fixed panes, and the circumference cooperates with the division bars to define a central opening. A sliding pane slides within the run channels between a closed position where the sliding pane closes the central opening and a full open position. The sliding pane slides at least partially outside the circumference of the frame when in the full open position, and a drive member such as a cable-drum window regulator attached to the sliding pane drives the sliding pane between the full open and closed positions. Preferably the division bars also extend beyond the circumference of the frame to provide guidance to the sliding pane when moving to and from the full open position.

In accordance with another aspect, a modular sliding window assembly is provided having four outside seals positioned around the central opening to prevent water, dirt and other elements from entering around the sliding pane when the sliding pane is in the closed position. First and second outside seals are attached to the division bars and positioned between the corresponding division bar and the sliding pane. Third and fourth outside seals are positioned between the sliding pane and the top and bottom segments of the frame, respectively.

In accordance with another aspect, a beltline support for enhancing structural rigidity of the window module connects the left and right division bars. The encapsulation frame at least partially encapsulates the division bars, and preferably entirely encapsulates the beltline support. The sliding pane is slidable from the closed position to an open position below the bottom segment of the frame.

From the foregoing disclosure and the following more detailed description of various preferred embodiments it will be apparent to those skilled in the art that the present invention provides a significant advance in the technology and art of sliding window assemblies. Particularly significant in this regard is the potential the invention affords for increasing air flow through an enlarged central opening while maintaining high aesthetics and structural integrity. Additional features and advantages of various preferred embodiments will be better understood in view of the detailed description provided below.

Figure 1:
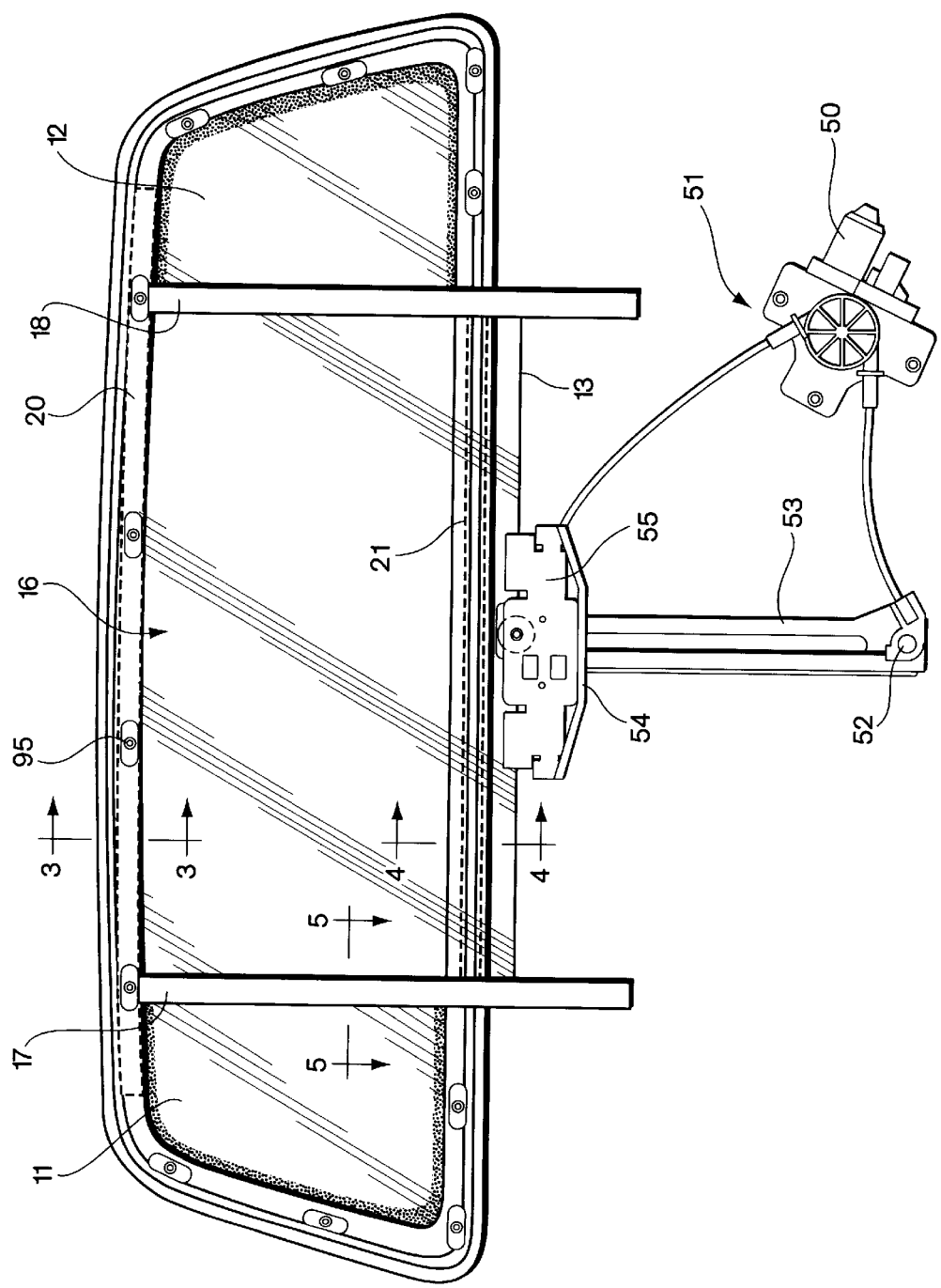
FIG. 1 is an inboard elevation view of a dropglass window module in accordance with a preferred embodiment.

It should be understood that the appended drawings are not necessarily to scale, presenting a somewhat simplified representation of various preferred features illustrative of the basic principles of the invention. The specific design features of the dropglass window module as disclosed here, including, for example, specific dimensions of the central opening and the sliding pane will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the sliding window assembly illustrated in the drawings. In general, front or frontward refers to a direction extending out of the plane of the paper in FIG. 1, and rear, rearward or backwards refers to a direction extending into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the sliding window assembly disclosed here. The following detailed discussion of various alternative and preferred features and embodiments will illustrate the general principles of the invention with reference to a dropglass sliding window module for use closing an opening in the back of a motor vehicle, such as a pickup truck or a sport utility vehicle (SUV). Other embodiments suitable for other applications will be apparent to those skilled in the art given the benefit of this disclosure.

Referring now to the drawings, FIG. 1 shows a preferred embodiment of a modular dropglass sliding window assembly 10. By the term "modular" or "module" it is meant that the window assembly is structurally self-supporting even as a pre-assembled unit prior to installation into a motor vehicle. The window assembly 10 has a first fixed pane 11 and a second fixed pane 12 positioned on either side of a sliding pane 13. The panes 11–13 are typically made of either a generally transparent glass or plastic such as a polycarbonate. A drive mechanism, such as a cable-drum window regulator, moves the sliding pane 13 between a full open position and a closed position. The sliding pane 13 closes a central air opening 16 when in the closed position. In the full open position, the pane 13 preferably, but not necessarily is dropped entirely out of the central opening. The drive mechanism comprises a motor 50, a cable-drum assembly 51, pulleys 52 (or sliders) for routing the cable to a glider 54 which slides up and down over a rail 53. The glider 53 slides up and down over the rail 53 in response to tension from the cable-drum assembly produced by actuation of the motor 50, and the glider is attached to a sliding pane attachment bracket 55, which is in turn attached to the sliding pane 13. Left and right division bars 17, 18 are positioned on either side of the sliding pane 13, in between the sliding pane and each of the fixed panes 11, 12. Each division bar defines a corresponding run channel 27, 28 which receives a corresponding vertical edge of the sliding pane. Each run channel has a corresponding run channel seal 23, 24. An encapsulation frame 14 has a circumference 44 forming, preferably, an unbroken ring of molded plastic material. The fixed panes are positioned within the circumference 44. The sliding pane 13 is also positioned within the circumference 44 when the sliding pane is in the closed position, preferably between the fixed panes. The circumference 44 of the frame has a top segment 97 and a bottom segment 96.

A skeletal framework of the dropglass module includes a header 20 and a beltline support 21. The header 20 is attached to both division bars 17, 18 at top segment 97 of the frame 14, and the beltline support 21 is attached to both division bars 17, 18 at bottom segment 96 of the frame 14. The header 20 is shown in cross section in FIG. 3 and the beltline support 21 is shown in the cross sectional view of FIG. 4. The header is preferably partially encapsulated by the frame, leaving a channel which the top peripheral edge of the sliding pane 13 dead ends into as the sliding pane moves to the closed position. The beltline support 21 is preferably entirely encapsulated by the frame so as not to be visible. The header and beltline support may be screwed or riveted to the division bars to form the skeletal framework of the module.

For ease of assembly, preferably the fixed panes 11 and 12, the skeletal framework and optional mounting studs 95 are inserted into a mold, and the frame is then injected or "shot" around these components, adhesively bonding to the division bars, 17 and 18, the header 20, the beltline support 21 and the fixed panes 11 and 12. The encapsulation material of the frame can comprise, for example, PVC or a reaction injection molded polyurethane (RIM). Optionally, primers may be applied to the fixed panes and/or to the skeletal framework to enhance adhesive bonding with the frame 14. To enhance the aesthetics of the dropglass module, preferably the top segment 97 and the bottom segment 96 of the encapsulation material covers the division bars near where the header 20 and beltline support 21 meet the division bars to create a uniform show surface on the outboard side. In addition, in certain preferred embodiments the fixed panes may be encapsulated on 3 sides by the frame, that is, the inboard, outboard and edge surfaces along the periphery of the fixed panes. In other preferred embodiments the frame may be adhesively bonded to only one side of the fixed panes, that is, the inboard surface, to produced an enhanced flush look.

Figure 2:
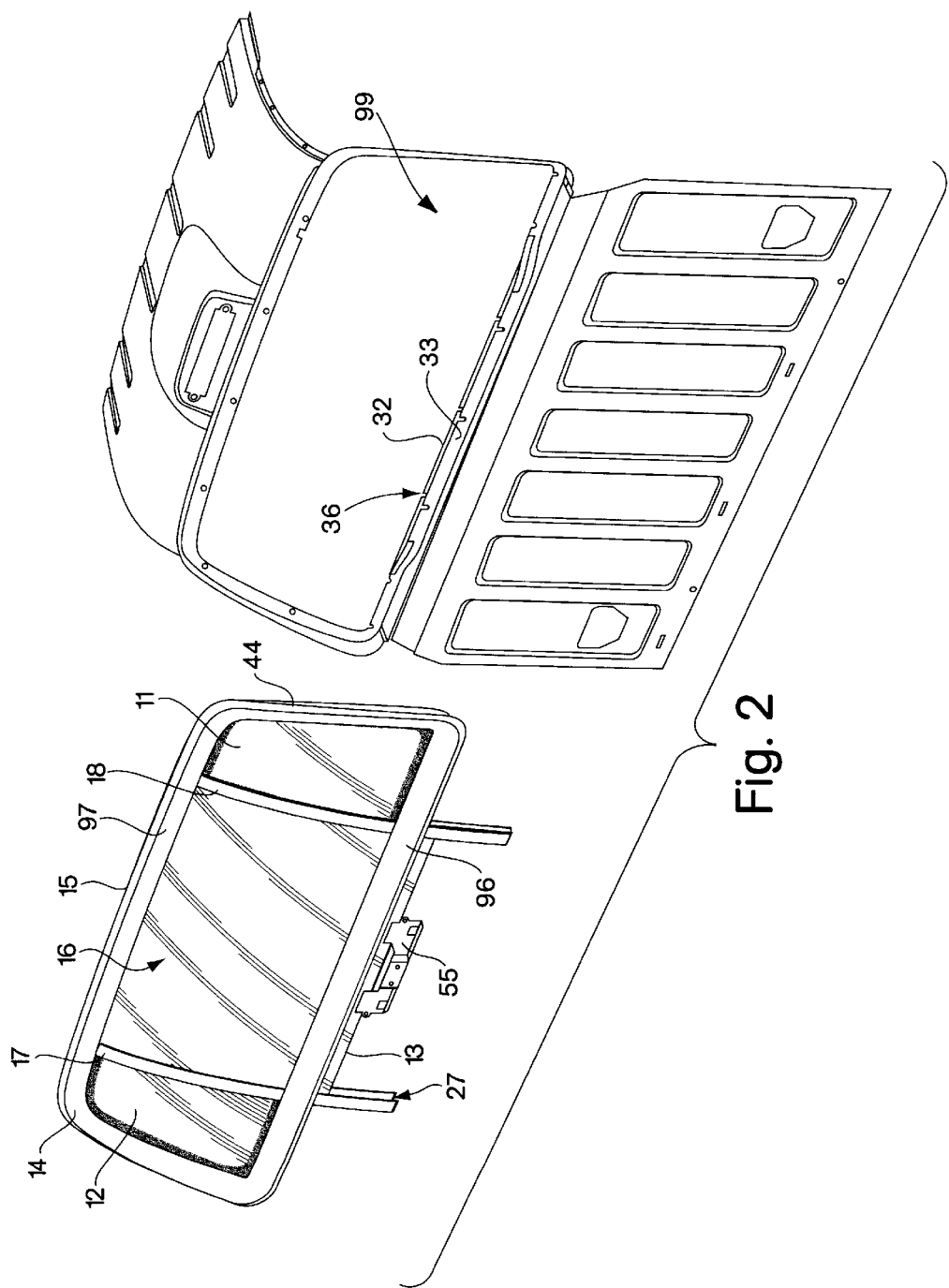
FIG. 2 is an outboard perspective view of the dropglass window module in FIG. 1 with the drive mechanism removed, showing where the module is installed into a motor vehicle body opening.

FIG. 2 shows a preferred embodiment with the motor and cable-drum assembly removed for clarity of illustration where the preassembled module 10 can close a back cavity 99 in a motor vehicle. The dropglass module 10 is attached to the motor vehicle with mounting studs extending from the encapsulation material of the frame 14, by adhesives, or by a combination thereof. The sliding pane 13 advantageously drops into a pocket 34 between an inner panel 32 and an outer panel 34 of the motor vehicle when the sliding pane is moving to the full open position. This has the advantageous effect of greatly increasing the allowable size of central air opening 16 without having the sliding pane extend laterally beyond the body of the motor vehicle.

Figure 3:
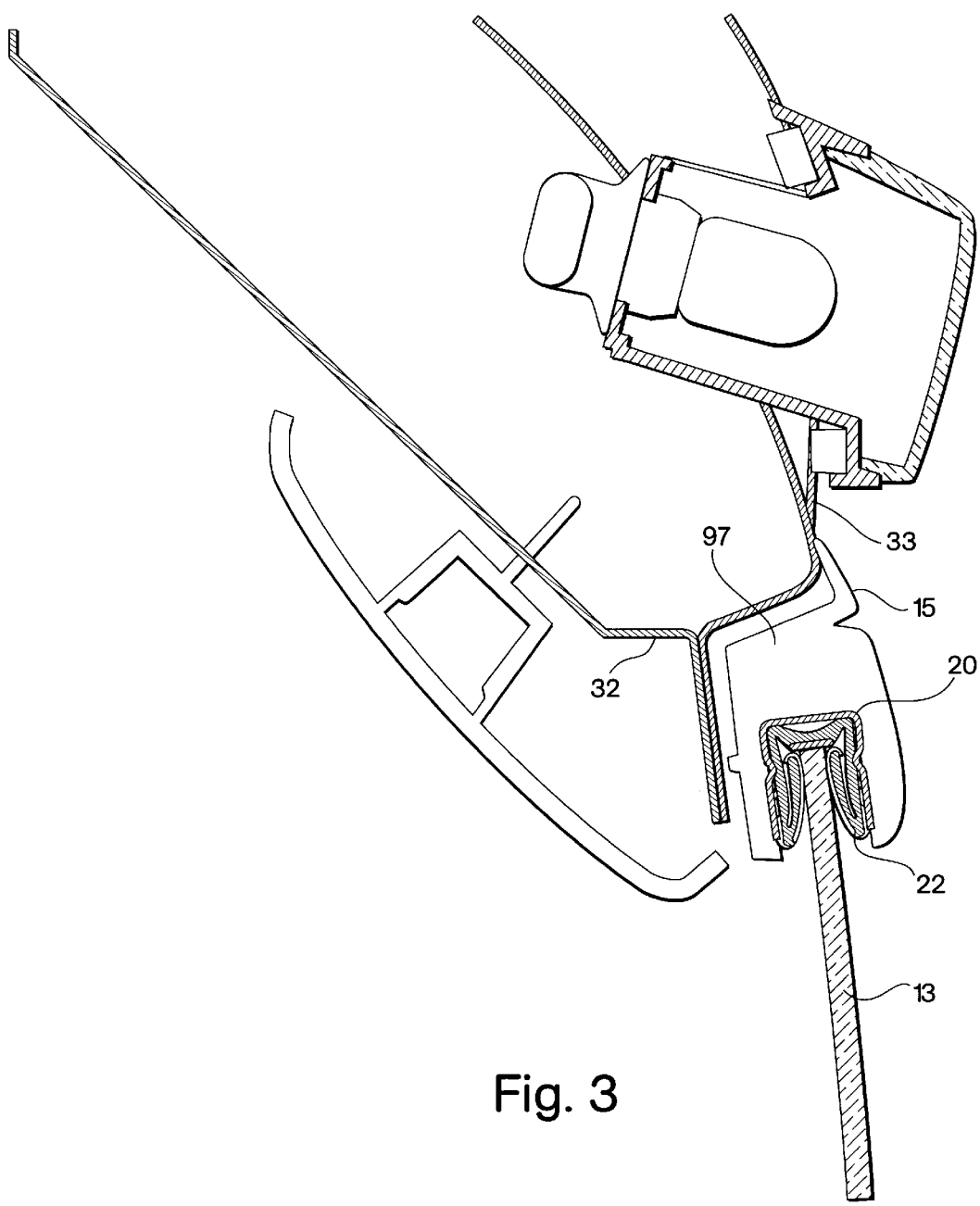
FIG. 3 is a cross section view of the header of the module of FIG. 1 taken along line 3—3 in FIG. 1, shown installed in the motor vehicle body opening illustrated in FIG. 2.

The header 20 is an elongate member with a generally C-shaped cross section at least partially encapsulated by frame 14, as shown in FIG. 3. A header seal 22 is inserted into the header. The sliding pane 13 dead ends at the header as it moves to the closed position, closing central air opening 16. Preferably a unitary portion of the frame forms a circumferential halo 15 extending radially outward from the circumference 44 generally in the plane of the frame to cover or hide from exterior view a shelf where the motor vehicle body outer panel 33 meets the motor vehicle body inner panel 32.

Figure 4:
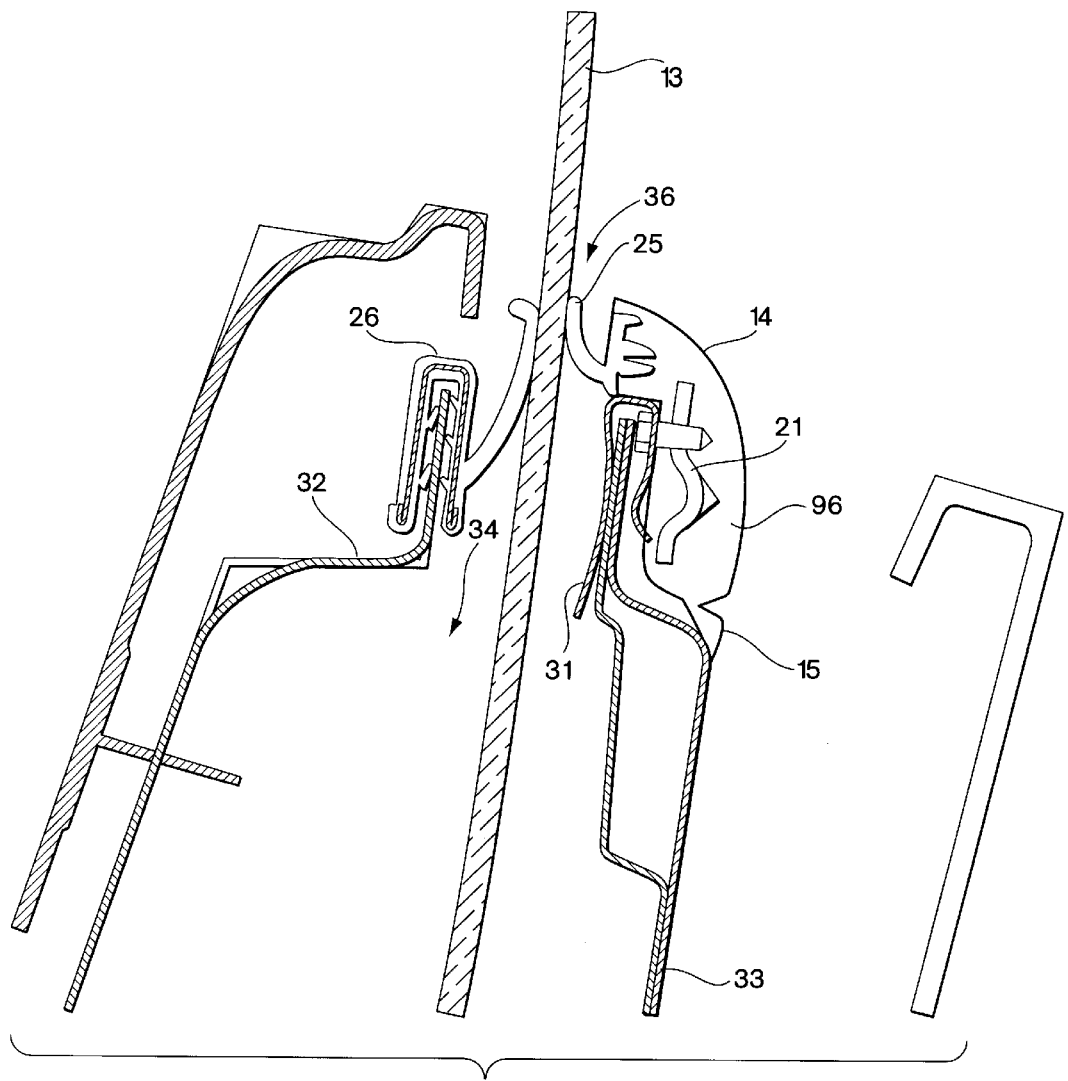
FIG. 4 is a cross section view of the beltline of the module of FIG. 1 taken along line 4—4 in FIG. 1, shown installed in the motor vehicle body opening illustrated in FIG. 2, and showing the guidance clip which fits over the outer panel of the motor vehicle body, helping to resist deflection of the window module.

FIG. 4 shows the beltline support 21 entirely encapsulated by the bottom segment 96 of the frame 14. The beltline support 21 enhances overall structural rigidity of the drop-glass module 10 and serves also to back up the outer panel 33 of the motor vehicle. Note that in the preferred embodiment shown in the drawings, the sliding pane 13 does not actually slide through an opening in the frame. Rather, the sliding pane slides on the inboard side of the bottom segment 96 of the frame into the pocket 34 through a slot 36 between inner beltline seal 26 attached to the motor vehicle body inner panel 32 and outer beltline seal 25 attached to the frame. Preferably the division bars also extend from the top segment 97 of the circumference of the frame 14 to below the bottom segment 96 of the circumference of the frame.

For ease of installation of the module into a motor vehicle body opening, a guidance clip 31 may be affixed to the bottom segment of the frame 14. The clip 31 serves as a temporary locator to guide the module into its installation position by snugly fitting over the outer panel 33, permitting attachment and alignment.

The header seal 22, shown in FIG. 3, and the outer beltline seal 25 shown in FIG. 4 cooperate with left and right run channel seals 23,24 to form an outside seal assembly to seal the central opening 16 when the sliding pane is in the closed position, thereby preventing water, dirt and other elements from entering the motor vehicle.

Figure 5:
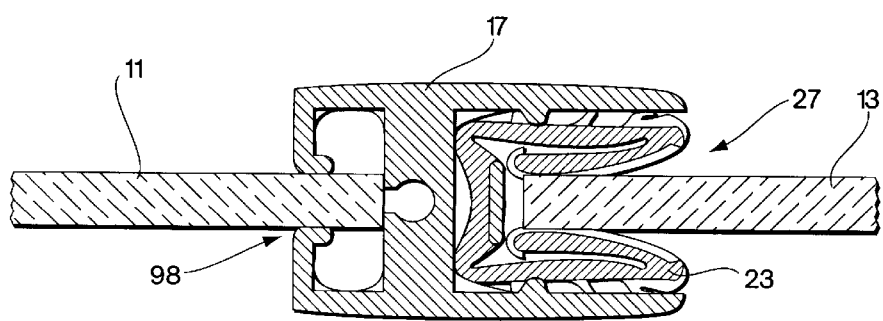
FIG. 5 is a cross section view taken along line 5—5 in FIG. 1 showing the run channel formed in one of the division bars and the sliding pane generally coplanar with one of the fixed panes.

Fixed panes 11, 12 may be installed into slots 98 in the division bar (FIG. 5). Both the fixed panes and the sliding pane may have some curvature so as to follow the general curvature of, and to be properly aligned with the surrounding motor vehicle body. In accordance with a feature greatly enhancing exterior styling, the fixed panes 11 and 12 are preferably generally coplanar with the sliding pane 13.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A modular sliding window assembly comprising, in combination;
    a first fixed pane and a second fixed pane;
    left and right division bars spaced from and substantially parallel to each other, each division bar having a run channel open toward the other run channel;
    an encapsulation frame adhesively bonding to the first fixed pane, the second fixed pane and the left and right division bars, the encapsulation frame having a circumference, wherein the frame cooperates with the left and right division bars to define a central opening and the first fixed pane is positioned on a left side of the central opening, the second fixed pane is positioned on a right side of the central opening, both of the fixed panes are positioned within the circumference of the frame;
    a sliding pane slidable between a full open position and a closed position within the run channels, wherein the central opening is closed by the sliding pane in the closed position, and the sliding pane is at least partially outside the circumference of the frame at all positions between the closed position and the full open position; and
    drive means for moving the sliding pane between the full open position and the closed position;
    wherein each division bar comprises a one-piece rigid member having a slot which receives a corresponding one of the first fixed pane and the second fixed pane.

2. The modular sliding window assembly of claim 1 wherein the sliding pane is coplanar with the first fixed pane and the second fixed pane.

3. The modular sliding window assembly of claim 1 wherein the division bars extend longitudinally beyond the circumference of the frame.

4. The modular sliding window assembly of claim 1 further comprising a header connecting the left and right division bars, and a beltline support connecting the left and right division bars.

5. The modular sliding window assembly of claim 4 wherein the beltline support is entirely encapsulated by the encapsulation frame.

6. The modular sliding window assembly of claim 1 further comprising a guidance clip mounted to the frame for aligning the frame over an outer panel of a motor vehicle.

7. A modular sliding window assembly comprising, in combination:
    left and right division bars spaced from and substantially parallel to each other, each division bar having a run channel open toward the other run channel;
    a header connecting the left division bar to the right division bar;
    a beltline support connecting the left division bar to the right division bar;
    an encapsulation frame at least partially encapsulating the left and right division bars the header and the beltline support, the encapsulation frame having a circumference, a top segment and a bottom segment, wherein the division bars extend longitudinally beyond the circumference of the frame and the top segment and the bottom segment cooperate with the division bars to define a central opening;
    a sliding pane slidable within the run channels between a full open position and a closed position wherein the sliding pane closes the central opening in the closed position;
    drive means for moving the sliding pane between the full open position and the closed position;
    a first outside seal attached to the left division bar and positioned between the left division bar and the sliding pane;
    a second outside seal attached to the right division bar and positioned between the right division bar and the sliding pane;
    a third outside seal positioned between the top segment of the encapsulation frame and the sliding pane;
    a fourth outside seal positioned between the bottom segment of the encapsulation frame and the sliding pane; and a guidance clip attached to the beltline support for aligning the frame over an outer panel of a motor vehicle.

8. The modular sliding window assembly of claim 7 further comprising a first fixed pane positioned adjacent the left division bar, and a second fixed pane positioned adjacent the right division bar, wherein the first and second fixed panes are adhesively bonded to the frame within the circumference of the frame.

9. The modular sliding window assembly of claim 8 wherein the sliding pane is coplanar with the first fixed pane and the second fixed pane as the sliding pane slides between the full open and closed positions.

10. The modular sliding window assembly of claim 7 wherein the drive means comprises a cable-drum window regulator attached to a bottom edge of the sliding pane.

11. The modular sliding window assembly of claim 7 wherein the frame is formed of a reaction injection molded polyurethane.

12. The modular sliding window assembly of claim 7 wherein the header is partially encapsulated by the top segment of the encapsulation frame and the third seal is attached to the header.

13. A modular sliding window assembly for closing an opening in a motor vehicle comprising, in combination:

a first fixed pane and a second fixed pane;

a left division bar and a right division bar spaced from and substantially parallel to each other and connected together by a beltline support;

a plastic frame at least partially encapsulating the left division bar and the right division bar, wherein a top segment of the frame and a bottom segment of the frame cooperate with the left and right division bars to define a central opening, and the beltline support is entirely encapsulated by the bottom segment of the frame;

a sliding pane slidable between a closed position where the sliding pane closes the central opening to an open position where at least a portion of the sliding pane is outside of the central opening and below the bottom segment of the frame; and drive means for driving the sliding pane between the open and closed positions;

wherein each division bar comprises a rigid member having a run channel which receives the sliding pane, and a slot which receives a corresponding one of the first and second fixed panes.

14. The modular sliding window assembly of claim 13 further comprising a header connecting the left division bar to the right division bar, and the top segment of the frame is adhesively bonded to the header.

15. The modular sliding window assembly of claim 13 wherein a portion of the left and right division bars extends past the bottom segment of the frame and is adapted to extend into a pocket formed between an inner panel and an outer panel of a motor vehicle.

16. The modular sliding window assembly of claim 15 further comprising a guidance clip affixed to the bottom segment of the frame and adapted to align the bottom segment of the frame over the outer panel of a motor vehicle.

17. The modular sliding window assembly of claim 15 further comprising an inner beltline seal attached to the inner panel and positioned at the opening, and an outside seal attached to the bottom segment of the frame and positioned at the opening, wherein the: sliding pane slides between the inner beltline seal and the outside seal and into the pocket as the sliding pane moves to the open position.

* * * * *